Sept. 9, 1958 G. W. ROHWEDER 2,850,864
DRIVING MEANS FOR HARVESTER CUTTER
Filed Oct. 22, 1956 2 Sheets-Sheet 1

INVENTOR.
G. W. ROHWEDER
BY

Sept. 9, 1958 G. W. ROHWEDER 2,850,864
DRIVING MEANS FOR HARVESTER CUTTER
Filed Oct. 22, 1956 2 Sheets-Sheet 2
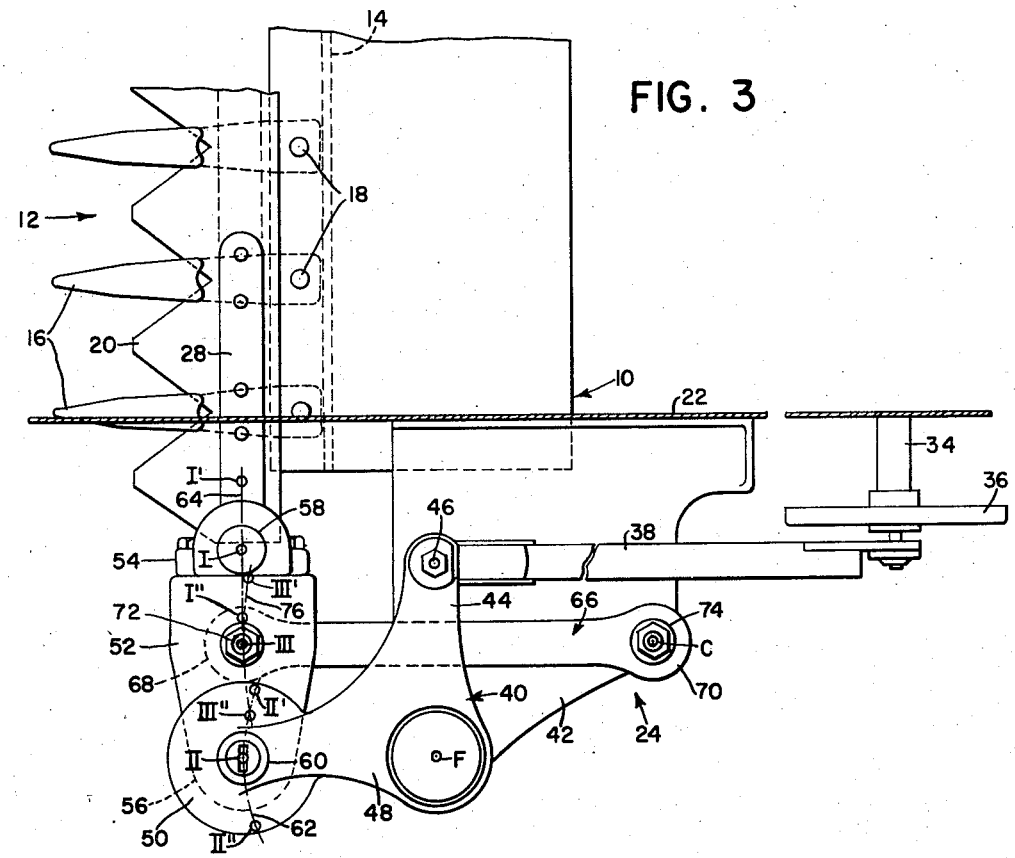
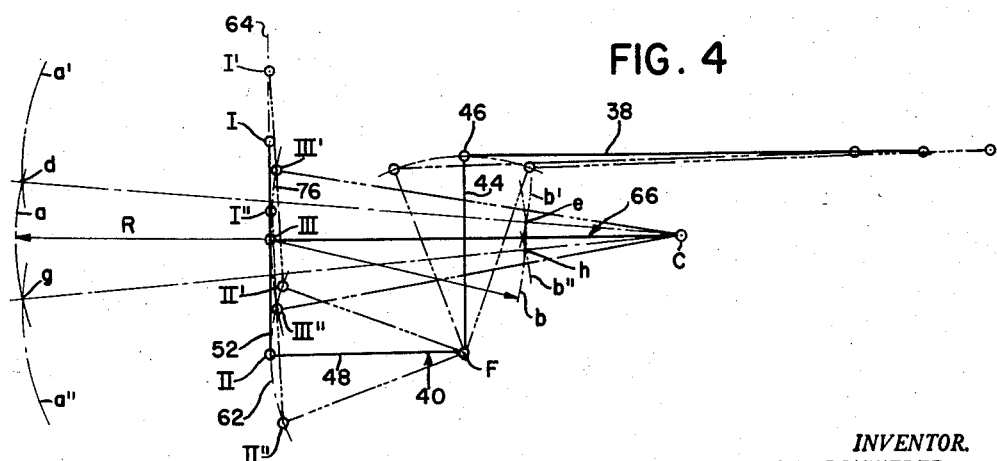
INVENTOR.
G. W. ROHWEDER

United States Patent Office 2,850,864
Patented Sept. 9, 1958

2,850,864

DRIVING MEANS FOR HARVESTER CUTTER

Glen W. Rohweder, Moline, Ill., assignor to Deere & Company, Moline, Ill., a corporation of Illinois Application October 22, 1956, Serial No. 617,626

5 Claims. (Cl. 56—296)

This invention relates to driving mechanism particularly adapted for driving the reciprocating cutter bar of a harvester or like machine.

In a typical reciprocating cutter, motion is transmitted to the cutter by a link and lever system which fundamentally involves a lever whose cutter-connected end moves in an arcuate path as compared to the desired straight-line path of the cutter. Although an intervening link is normally used between the oscillating or swinging arm and the straight-line cutter, forces developed in the motion-transmitting mechanism are transmitted to the cutter in directions transverse to the straight-line path. Ordinarily, these forces are absorbed by appropriate means guiding the cutter in the cutter bar. As will be appreciated, these guiding means must be relatively accurate and long-wearing and are therefore somewhat expensive. According to the present invention, the control of the linkage is accomplished in a much simpler and considerably less expensive manner by means stabilizing the linkage and therefore eliminating the need for expensive guide means and other bearings.

The invention has for its principal object the provision of improved stabilizing means operating on the drive linkage independently of the cutter itself. Specifically, it is an object of the invention to utilize a stabilizing link connected at one end to the link that intervenes between the straight-line cutter and the oscillating drive arm, the other end of the stabilizing link being connected to the supporting frame on a center spaced from the arm center and so arranged and located that the pivotal connection between the drive link and the cutter travels in a straight-line parallel to the straight-line path of the cutter, whereby the stabilizing link, operating in tension and compression, absorbs the forces transverse to the line of reciprocation, thereby relieving the cutter bar of the task of absorbing these forces. A further object of the invention resides in the adaptation of a stabilizing link to driving linkage of a known construction, whereby such known constructions may be readily modified by utilization of the drive link established on the basis of the geometry to be set forth hereinafter.

The foregoing and other important objects and desirable features inherent in and encompassed by the invention will become apparent to those versed in the art as a preferred embodiment of the invention is disclosed, by way of example, in the ensuing specification and accompanying sheets of drawings, the several figures of which are described immediately below.

Fig. 3 is a plan view of the structure shown in Figs. 1 and 2.

Fig. 4 is a schematic view showing the various positions assumed by the parts of the drive mechanism.

Figure 1:
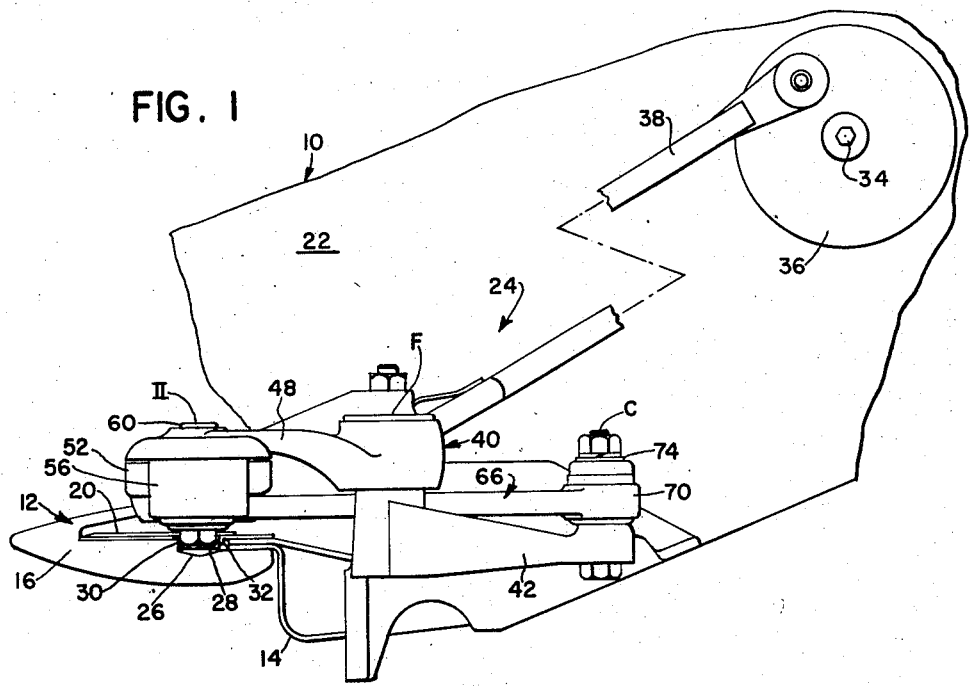
Fig. 1 is a fragmentary elevation of a harvester, illustrating part of the driving mechanism.
Figure 2:
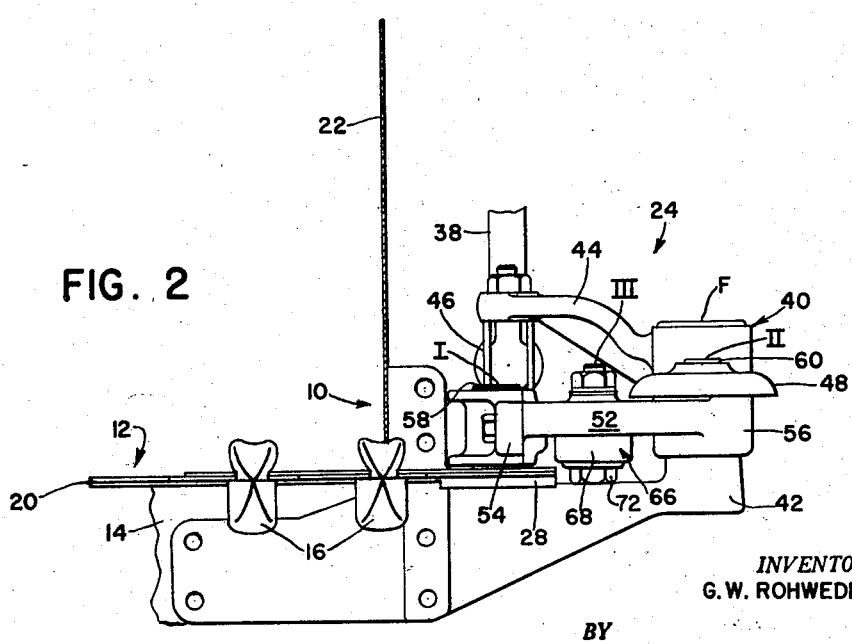
Fig. 2 is a front elevational view of the structure shown in Fig. 1.

Only so much of a typical harvester is illustrated in the drawings as is necessary to orient the invention. The numeral 10 designates generally the supporting frame of the harvester and the numeral 12 designates the cutting mechanism. The supporting frame includes a transverse support or bar 14 on which the cutting mechanism 12 is supported. The cutting mechainsm, as is conventional, includes a plurality of guard fingers 16, rigidly attached at 18 to the bar 14, and a reciprocating cutter 20 which cooperates with the guard fingers 16 in the usual manner. The frame includes at one side thereof a side sheet 22 outside of which driving mechanism 24 operates to reciprocate the cutter 20. The details of the drive mechanism will be covered below.

As best shown in Fig. 1, each guard, as is conventional, is recessed at 26 to accommodate a knife-head 28 that is rigidly connected to the cutter 20 as an extension thereof. Wear plates 30 and 32 form front and rear bearing surfaces in which the knife head and cutter are guided for reciprocation along a straight-line path. The structure just described is representative of cutter-mounting means for accomplishing guiding of the cutter bar as aforesaid. For reasons to be pointed out below, the guiding means may be simply and inexpensively constructed, since they are freed from forces of substantial magnitude transverse to the straight-line path.

The supporting structure or frame 10 carries a transverse drive shaft 34 which may be driven from any suitable source of power, not shown here. Keyed to the shaft 34 is a disk or flywheel 36 which through the medium of a fore-and-aft pitman 38 drives a bell crank 40 which is fulcrumed on an upright axis at F to a mounting bracket 42 forming part of or secured to the basic frame 10. One arm of the bell crack, as at 44, is connected by a suitable ball and socket joint 46 to the forward end of the pitman 38, and the other arm 48 of the bell crank 40 serves as a drive arm having a mounted end at the fulcrum and further having a free end 50 which, obviously, travels in an arc as the bell crank oscillates about the fulcrum F.

A drive link 52 extends between the free end 50 of the bell crank arm 48 and the knife head 28. This link has first and second ends 54 and 56 respectively, which ends are connected by first and second pivot means 58 and 60 respectively to the knife head and free end 50 of the arm 48. The first and second pivot means respectively include first and second axes I and II parallel to the axes of the fulcrum F.

From the description thus far, it will be seen that oscillation of the bell crank 40 causes the free end 50 of the drive arm 48 to swing back and forth through an arc having the fulcrum axis F as its center. Consequently, the axis II of the pivotal connection 60 will swing back and forth through an arcuate path 62 (Figs. 3 and 4). Reciprocation of the cutter and knife head 28 will follow a straight-line path 64. Since the arcuate path 62 is inconsistent with the straight line path 64, it follows that fore-and-aft forces, or forces transverse to the path 64, will be transmitted by the link 52 to the cutter and knife head during oscillation of the bell crank 40. As previously indicated, these forces can be absorbed by relatively expensive and precision-manufactured guides in place of the simple guides at 30 and 32. As pointed out above, it is the principal object of the present invention to eliminate the need for such expensive guide means.

This object is accomplished by stabilizing means, here a stabilizing link 66 having a first end 68 and a second end 70. The first end of the stabilizing link 66 is connected to the drive link 52 by a pivotal connection 72 which includes an axis III parallel to the axes I and II. The second end 70 of the stabilizing link includes mounting means 74 providing a mounting center axis C on the mounting member or bracket 42.

The critical points involved in the driving mechanism and the stabilizing of the link 52 by the stabilizing link 66 are illustrated schematically in Fig. 4 and involve the bell crank fulcrum F, the stabilizing link 66, the mounting center C of the stabilizing link, and the pivotal connections I, II and III. In general, the relationship is such that the pivot point III travels in an arc 76 while the point II travels on the previously described arc 62 and the point I travels along the straight-line 64 as described above. The arc 76 is drawn about the mounting center C as its center. In other words, the point III is a point on the link 52 other than the points I and II and the mounting center C is a pivot axis other than the fulcrum F.

In the particular embodiment shown, the location of the mounting center C and the length of the stabilizing link 66 are determined on the basis of the geometry to be described below.

Because of dimensional characteristics of the pitman 38, the lengths of the bell crank arms 44 and 48 and the throw of the crank established by the connection of the pitman 38 to the flywheel 36, the angular range of arcuate travel of the point II can be readily determined. In Figs. 3 and 4, the point just referred to is shown in a mid-position of the bell crank. Accordingly, the points I and III will be in their respective mid-positions. As the bell crank 40 rocks first in a clockwise direction, the point II will travel to the position II′, and it follows that the points I and III will travel respectively to points I′ and III′. The distance between points I and II is constant, as is the distance between points I and III.

With the various components in their respective mid-positions as described, as shown in heavy lines in Fig. 4 and as shown pictorially in Fig. 3, an arc $a$ is struck on a radius R about the point III, and a second arc $b$ on the same radius R is struck about the point III diametrically opposite the arc $a$. With the parts moving on the "in" stroke of the cutter, so that the points I, II and III travel respectively to I′, II′ and III′, an arc $a'$ is struck about the point III′, again using the radius R, and a second arc $b'$, again using the radius R, is struck about the point III′, diametrically opposite from the arc $a'$. The arcs $a$ and $a'$ intersect at point $d$ and the arcs $b$ and $b'$ intersect at the point $e$.

On the other half or "out" stroke of the cutter, the points I, II and III travel from their respective mid-positions to "out" positions I″, II″ and III″. With the point III″ as a center, an arc $a''$ and a second arc $b''$ are drawn at diametrically opposite sides of point III″, on the radius R. The arcs $a$ and $a''$ will intersect at point $g$ and the arcs $b$ and $b''$ will intersect at point $h$. Having now located these points, lines $d$—$e$ and $g$—$h$ are drawn and extended. The point at which these lines intersect will determine the location of the mounting center C. The length of the link 66 is the distance between the point C and the point III. As already indicated, the geometry just described controls the link 52 so that the point III travels on the arc 76 while the point I travels in the straight-line 64. Since this line is parallel to the straight-line path of the cutter, it follows that the cutter will travel in a straight line. The link 66 operates in both tension and compression to absorb all forces transverse to the line 64 and therefore eliminates the necessity of providing expensive and complicated guiding means for the cutter. The link 66 is connected directly to the link 52 and is therefore independent of the cutter, which greatly simplifies and reduces the cost of the drive mechanism and the control therefor. The length of the radius R, as well as the location of the point III may be arbitrarily chosen, as long as the radius R is sufficiently long to place the mounting center C rearwardly beyond and otherwise offset from the point F. This selection is determined, as a commercial proposition, largely on the basis of space limitations and such things as the conveniently permissible size of the mounting bracket 42. Apart from that, the principles of the invention may be readily followed to adapt the construction to special situations in harvester cutting mechanism.

Features of the invention not categorically enumerated will readily occur to those versed in the art, as will modifications of the structure falling within the spirit and scope of the invention.

What is claimed is:

1. In a harvester having a supporting frame, a cutter, and cutter-mounting means mounting the cutter on the frame for reciprocation along a straight-line path, the improvement residing in drive mechanism for the cutter, comprising: a drive arm having a free end generally alined with the cutter along said path of reciprocation and a mounted end spaced from said path and including a fulcrum on the frame for oscillation of the arm so that the free end thereof travels back and forth in an arcuate path; a drive link having first and second ends and extending between the cutter and the drive arm and having first and second pivot means respectively to the cutter and to the free end of the drive arm respectively on first and second axes parallel to the axis of said arm-to-frame fulcrum; and a stabilizing link having a first end including a pivotal connection to the drive link on an axis intermediate and parallel to said first and second axes and further having a second end including a mounting center on the supporting frame on an axis parallel to all of said axes, said stabilizing link having such length and said mounting center being so located that the aforesaid first pivot means between the drive link and the cutter is caused to travel in a straight line during oscillation of the drive arm whereby said stabilizing link absorbs forces transverse to the path of reciprocation of the cutter.

2. In a harvester having a supporting frame, a cutter, and cutter-mounting means mounting the cutter on the frame for reciprocation along a straight-line path, the improvement residing in drive mechanism for the cutter, comprising: a drive arm having a free end generally alined with the cutter along said path of reciprocation and a mounted end spaced from said path and including a fulcrum on the frame for oscillation of the arm so that the free end thereof travels back and forth in an arcuate path; a drive link having first and second ends and extending between the cutter and the drive arm and having first and second pivot means respectively to the cutter and to the free end of the drive arm respectively on first and second axes parallel to the axes of said arm-to-frame fulcrum; and stabilizing means independent of the aforesaid cutter-mounting means and connected to the drive link for controlling said link so that the aforesaid first pivot means between the drive link and the cutter is caused to travel in a straight line during oscillation of the drive arm whereby said stabilizing means absorbs forces transverse to the path of reciprocation of the cutter.

3. In a harvester having a supporting frame and a reciprocable cutter, the improvement residing in drive mechanism for the cutter, comprising; a drive arm having a free end generally alined with the cutter along the path of reciprocation and a mounted end spaced from said path and including a fulcrum on the frame for oscillation of the arm so that the free end thereof travels back and forth in an arcuate path; a drive link having first and second ends and extending between the cutter and the drive arm and having first and second pivot means respectively to the cutter and to the free end of the drive arm respectively on first and second axes parallel to the axis of said arm-to-frame fulcrum for reciprocating the cutter upon oscillation of the arm; and stabilizing means connected between the supporting frame and the link and independent of the cutter for causing the aforesaid first pivot means between the drive link and the cutter to travel in a straight line parallel to the path of reciprocation of the cutter.

4. In a harvester having a supporting frame and a reciprocable cutter, the improvement residing in drive mechanism for the cutter, comprising: a drive arm having a free end generally alined with the cutter along the path of reciprocation and a mounted end spaced from said path and including a fulcrum on the frame for oscillation of the arm so that the free end thereof travels back and forth in an arcuate path; a drive link having first and second ends and extending between the cutter and the drive arm and having first and second pivot means respectively to the cutter and to the free end of the drive arm respectively on first and second axes parallel to the axis of said arm-to-frame fulcrum for reciprocating the cutter upon oscillation of the arm; and a stabilizing link having a first end including a pivotal connection to the drive link on an axis intermediate and parallel to said first and second axes and further having a second end including a mounting center on the supporting frame on an axis parallel to all of said axes, said stabilizing link having such length and said mounting center being so located that the aforesaid first pivot means between the drive link and the cutter is caused to travel in a straight line during oscillation of the drive arm whereby said stabilizing link absorbs forces transverse to the path of reciprocation of the cutter.

5. In a harvester having a supporting frame, a cutter, and cutter-mounting means mounting the cutter on the frame for reciprocation along a straight-line path, the improvement residing in drive mechanism for the cutter, comprising: a drive arm having a free end generally alined with the cutter along said path of reciprocation and a mounted end spaced from said path and including a fulcrum on the frame for oscillation of the arm so that the free end thereof travels back and forth in an arcuate path; a drive link between the cutter and the drive arm and including first pivot means connecting said link to the cutter on an axis parallel to the fulcrum axis and second pivot means connecting said link to the free end of the drive arm on a second axis also parallel to said fulcrum axis, said link serving to translate oscillation of the arm into reciprocation of the cutter so that the first pivot means partakes of the straight-line motion of the cutter while the second pivot means follows the arc of the free end of the drive arm and a point on said link other than said first and second pivot means travels in an arc about a center on an axis parallel to but spaced from said fulcrum axis; and a stabilizing link pivoted at one end to the drive link at said point on an axis parallel to all of said axes and pivoted at its other end to said center, said stabilizing link being effective in tension and compression to absorb forces transverse to the path of reciprocation of the cutter so as to retain said straight-line motion of said first pivot means and accordingly to remove said forces from the cutter.

References Cited in the file of this patent

UNITED STATES PATENTS

| 920,000 | Anderson et al. | Apr. 27, 1909 |
| 2,328,838 | Oberlink | Sept. 7, 1943 |